Sept. 15, 1953 C. E. HUNT, JR 2,652,448

FACSIMILE APPARATUS FOR REPEAT COPIES

Filed Jan. 18, 1951 2 Sheets-Sheet 1

CLAYTON E. HUNT, JR.

Inventor

Daniel J. Mayne

By Frank R. Gollon

Attorneys

Sept. 15, 1953 C. E. HUNT, JR 2,652,448

FACSIMILE APPARATUS FOR REPEAT COPIES

Filed Jan. 18, 1951 2 Sheets-Sheet 2

CLAYTON E. HUNT, JR.
Inventor

By Daniel I. Mayne
Frank R. Gollon
Attorneys

Patented Sept. 15, 1953

2,652,448

UNITED STATES PATENT OFFICE 2,652,448

FACSIMILE APPARATUS FOR REPEAT COPIES

Clayton E. Hunt, Jr., Rochester, N. Y., assignor to Eastman Kodak Company, Rochester, N. Y., a corporation of New Jersey Application January 18, 1951, Serial No. 206,618

15 Claims. (Cl. 178—6.6)

This invention relates to facsimile reproduction and more particularly to a facsimile apparatus for making repeat copies. Specifically, it relates to a facsimile scanning device having a selector mechanism, through the presetting of which, the scanning of the sheet to be copied will be automatically repeated a predetermined or an indefinite number of times in accordance with the desire of the operator.

The present invention is especially adapted for use in facsimile duplicating apparatus in which the sheet of copy to be reproduced is mounted upon a rotatable drum and scanned thereon by a scanning head or unit which travels along a linear path parallel to the axis of the drum. Each rotation of the drum, in effect, produces a line-scanning operation and this motion, in conjunction with the linear movement of the scanning head, results in the entire sheet being scanned as the scanning head moves from one end of the drum to the other. In this interim the recorder, which is directly connected to the transmitter, or remotely controlled thereby, will produce a single copy of the sheet which has been scanned. In order to produce a plurality of facsimile copies a number of recorder units could be simultaneously operated on the signals received from the single scanning at the transmitter. This, however, is not feasible where a large number of copies is to be produced because of the necessary duplication of expensive equipment. A duplicating apparatus, which produces a single copy with each scanning of the original and which may be preset by the operator to cause the machine to automatically repeat the scanning operation until the desired number of copies has been made, offers the more practical solution and the present invention is directed to such a facsimile duplicator which will automatically produce a predetermined or an indefinite number of copies merely by the manipulation of a hand dial which indicates the number of scannings to be effected by the apparatus.

It will be apparent that it is necessary to return the scanning head to its starting position after completing a scanning of the sheet preparatory to repeating this operation. The present device includes a novel drive and reversing mechanism for the scanning head which is automatic in its operation and which cooperates with the selector mechanism to repeat the scanning operation as many times as there are copies to be made. It will be obvious that the linear movement of the scanning head is relatively slow while this element is scanning the sheet mounted upon the drum, but on the return of the head to its starting position the head should be returned in a minimum length of time. Accordingly, the drive and reversing mechanism employed in the present device is adapted to drive the scanner head forward at the necessary scanning speed and to return it to its starting position at a considerably higher rate of speed.

The reversing mechanism functions through the operation of a solenoid which is alternately energized and deenergized by the scanning head making contact with certain control elements positioned at each end of the path of travel of said head. Since these elements are adjustable in position, they can be preset to determine the length of the sheet to be scanned. The apparatus embodying the present invention is, therefore, adaptable to scanning sheets of different sizes, the time of scanning being materially reduced where smaller sheets are to be copied.

The selector mechanism of the present invention functions in cooperation with the drive for the scanning head and the reversing mechanism and may be preset by the operator to produce some finite number of copies, after which the scanning head will automatically come to a halt at its initial starting position. A novel feature of the selector mechanism is the means incorporated therein by which the apparatus may be caused to repeat indefinitely whereby the device will continue to produce copies until the operator interrupts the operation of the apparatus.

All of the above operations are performed by the apparatus embodying the present invention in an efficient and novel manner, as will be apparent from the following detailed description of the apparatus.

It is, therefore, an object of the present invention to provide a new and improved facsimile apparatus for the purpose of automatically producing duplicate copies of a number determined by the operator.

It is a further object of this invention to provide an apparatus of the character described which includes a novel drive and reversing mechanism for the scanning head.

It is a still further object of this invention to provide an apparatus of the character described which includes a novel selector mechanism that functions in cooperation with the drive means and reversing mechanism whereby by a mere presetting thereof the apparatus will continue to produce copies until a predetermined number has been made, whereupon the scanning will automatically come to a halt.

It is a still further object of this invention to provide an apparatus of the character described wherein the selector mechanism may be preset to automatically repeat the scanning operation whereby an indefinite number of copies will be produced.

Other objects and advantages of the invention will become apparent from the following description taken in connection with the accompanying drawings, and it will be understood that many changes may be made in the details of construction and arrangement of parts shown and described without departing from the spirit of the invention as expressed in the accompanying claims. I, therefore, do not wish to be limited to the exact details shown and described as the preferred form only has been shown by way of illustration.

Figures 1, 2, 3, 4:
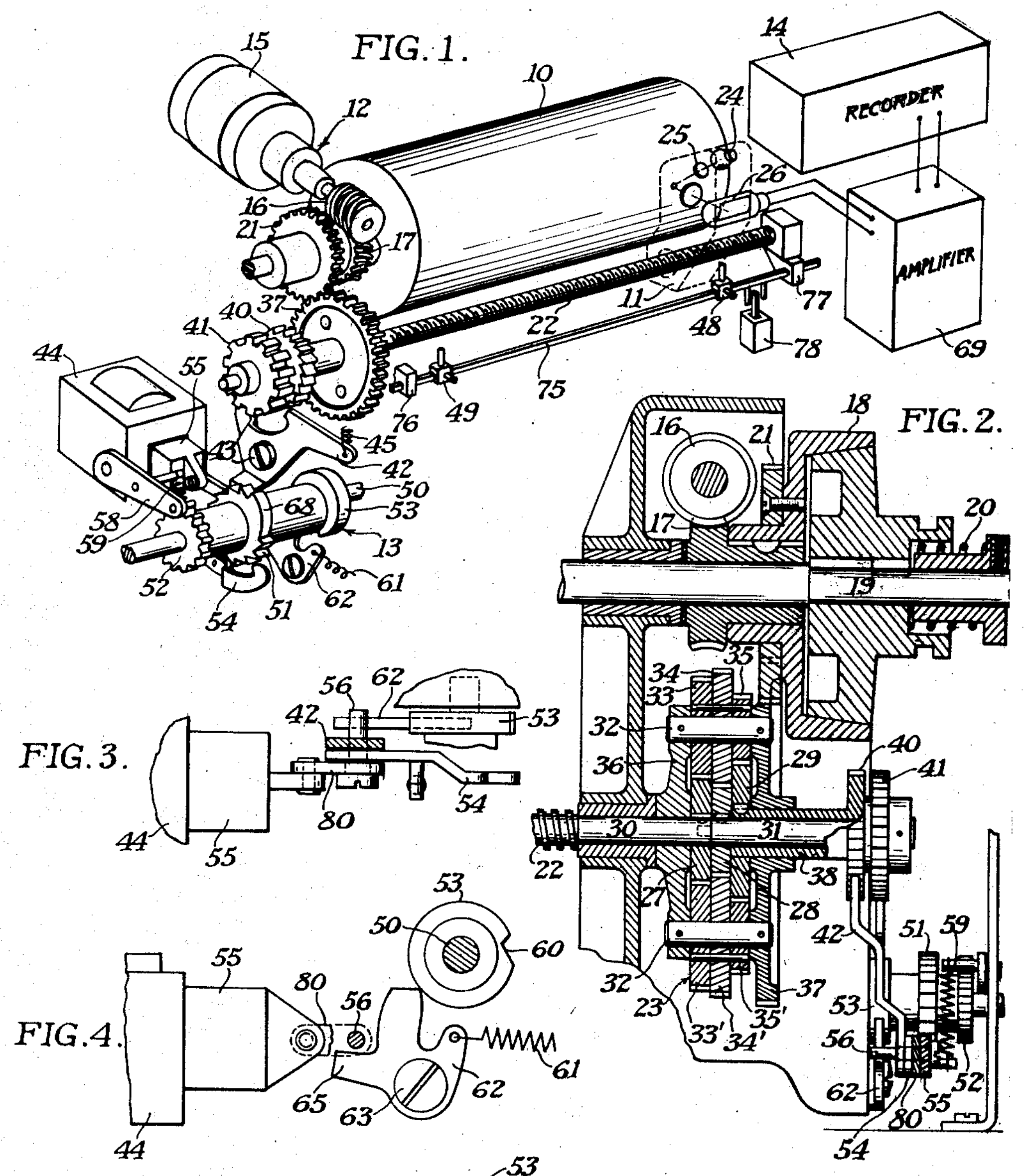
Fig. 1 is a perspective view of a facsimile apparatus embodying the present invention.
Fig. 2 is an enlarged sectional view, illustrating the reversing and the selector mechanisms.
Fig. 3 is an enlarged plan view of certain details of the selector mechanism.
Fig. 4 is an enlarged elevational view of a detail of the selector mechanism whose function is to stop the scanning operation after the desired number of copies has been produced.

The preferred form of the facsimile apparatus embodying the present invention, as seen in Fig. 1, comprises the rotatable drum 10 upon which the sheet to be duplicated is mounted, the scanning head 11, drive means 12 for rotating the drum and moving the scanning head in a path parallel to the axis of the drum, the selector mechanism 13 for determining the number of copies to be produced, and the recorder unit 14 for printing the facsimile copies. The drum 10 is of conventional construction, having means associated therewith for mounting the sheet to be copied. Such mounting means are of various types and are familiar to those skilled in the facsimile art and, since they form no part of the present invention, they are not described in this application. The drum and scanning head are driven by the motor 15, the motor shaft having a worm 16 fixed thereto which meshes with the worm gear 17. The latter has a sleeve integral therewith which is keyed to one of the two elements comprising the clutch 18, as clearly illustrated in Fig. 2. The other of said clutch elements is slidably keyed to the shaft 19 upon which the drum 10 is mounted, the spring 20 being under compression to force the slidable clutch element into frictional contact with the other clutch element whereby rotation of the worm 16 will impart a corresponding rotation to the drum 10. Although not shown, the slidable clutch element is adapted to be retracted against the spring 20 by the action of a solenoid actuated by a switch when the last copy has been made, as will be further described below.

To the nonsliding clutch element is fixed a spur gear 21 which is rotated, therefore, by the worm gear 17. The function of gear 21 is to rotate the screw 22 through the planetary transmission unit 23, the purpose of which, as will be later evident, is to function as a reversing mechanism to alternately rotate the screw 22 clockwise and counterclockwise and at different speeds. The screw itself is threaded into the scanning head 11 which is caused to travel along the length thereof by the rotation of the screw. The scanning head itself is of conventional construction, having a source of illumination 24, an optical system 25 for focusing a light spot upon the sheet being scanned, and the usual photoelectric cell 26.

The planetary transmission unit 23 comprises a series of three sun gears 27, 28 and 29 which are mounted concentrically about the axis of the screw 22. The gear 27 is keyed to the shaft 30 which is integral with the screw 22, while the gear 28 is keyed to a second shaft 31 which is concentric with shaft 30 but free to rotate independently of shaft 30. Gear 29 is in turn keyed to the sleeve 38 which is free to rotate on shaft 31. Each of said sun gears meshes with a pair of diametrically opposed planet gears, these gears being rotatably mounted upon the studs 32, as illustrated in Fig. 2. Planet gears 33, 34 and 35 are pinned together to rotate in unison, as are planet gears 33', 34' and 35'. The studs 32 are mounted in the plates 36 and 37 which thus comprise a casing for the several sun and planet gears. Plate 37 is also provided with gear teeth about its peripheral edge which mesh with the spur gear 21 and is driven thereby. Rotation of the plate 27 thus carries the studs 32 in a circular path about the axis of the sun gears. The gears 33, 34 and 35 are each provided with a different number of teeth, as are the corresponding sun gears 27, 28 and 29, for reasons which will become obvious from the additional description given below. Since the gears 33, 34 and 35 are relatively fixed by the pin therethrough, the revolution of these about the axis of the sun gears will cause relative rotation between the corresponding sun gears. Assuming that the shaft 31 and the sleeve 38 are free to rotate, the shaft 31 and the sleeve 38 will rotate at different speeds while the screw shaft 30 remains static. This will normally occur because of the greater friction and inertia that must be overcome to rotate shaft 30 than is required to rotate shaft 31 and sleeve 38. Planet gears 33 and 33' will thus rotate as they revolve about sun gear 27 without rotating the latter, with the result that no motion will be given to the scanning head 11. If, however, either shaft 31 or sleeve 38 is secured against rotation, the movement of the studs about the axis of the sun gears will cause the pinned gears 33, 34 and 35 to rotate at a velocity determined by the relative number of teeth on the sun gear keyed to the shaft or sleeve fixed against rotation and its corresponding planet gear. This rotation of the pinned planet gears combined with the revolution of the studs upon which these are mounted will result in the sun gear 27 being rotated to drive the screw 22 and the scanning head. Depending upon the relative speed ratios of gears 34 and 28 and gears 35 and 29, the locking of gear 28 can be made to cause the screw 22 to rotate in one direction while the locking of gear 29 will cause the screw 22 to rotate in an opposite direction. Moreover, by a suitable selection of speed ratios the rotation of the screw in one direction will be of a considerably greater speed than the rotation in the other direction.

It will be obvious that the described planetary transmission may thus be employed to alternately drive the scanning head forward at the necessary slow speed for scanning and back again to its initial starting position at a relatively high speed by alternately locking the gears 28 and 29 against rotation. As an example of the relative gear ratios which I have found suitable for the purpose of my invention, gears 33, 34 and 35 are provided with 33, 35 and 19 teeth, respectively, and gears 27, 28 and 29 with 30, 28 and 44 teeth, respectively. Other ratios can obviously be employed to accomplish the desired end and the selection of the individual planet and sun gear sizes will be well within the ability of those skilled in the art. The planet gears may be pinned together, as described, and be free to rotate upon the stud 32, or, as an alternative, these may be keyed to the stud, the latter being journalled for rotation in the plates 36 and 37.

The means for alternately locking the sleeve 38 and the shaft 31 against rotation comprises the ratchet 40 and the notched disc 41, the former being fixed to the sleeve, the latter fixed to the shaft. A reversing lever 42, pivoted about the pin 43 is adapted to be rocked into either of two positions by the combined action of the solenoid 44 and the coil spring 45. The lever 42 is itself provided with two arms, one of which terminates in the pawl 46, which is adapted to engage the ratchet 40 in one position of the lever, and the second of which terminates in the tooth 47, which is adapted to engage the notched disc in the second position of the lever. The lever in rocking between these two positions will, thus, alternately engage the ratchet and the notched disc to alternately lock the sleeve 38 and shaft 31, whereby the drive means will alternately move the scanning head in reverse and then forward, as will be now apparent from the above description of the planetary transmission 23.

The lever 42 is adapted to be rotated to the position in which the pawl 46 engages the ratchet 40 by the energizing of the solenoid 44, which is effected by the scanning head contacting the control element 48 as it reaches the end of the sheet it is scanning. The control element 48 is secured to the bar 75 which is slidably mounted in the supports 76 and 77. The sliding of the bar to the right (Fig. 1) by the scanning head engaging the control element 48 will close the snap switch 78 which energizes the solenoid, whereupon the lever is pivoted about 43 to lock the ratchet and the sleeve 38 to which it is fixed and the drive means rotates the screw 22, as has already been described, in a reverse direction and at a relatively high speed to return the scanning head to its initial position. Upon reaching this position the head makes contact with a second control element 49 which is also secured to the bar 75 and thus moves the bar to the left which opens the switch 78 to deenergize the solenoid and the coil spring 45 then pivots the lever 42 to disengage the ratchet and to engage the notched disc 41 by means of the tooth 47 to lock the shaft 31 against rotation and free the sleeve 38. The drive means now rotates the screw in the opposite direction and drives the scanning head at the slower rate necessary for the scanning operation. In this manner the scanning operation is automatically and continuously repeated. The control elements 48 and 49 are positionally adjustable on the bar 75, to which they may be fixed by set screws, by which the length of travel of the scanning head may be predetermined in accordance with the length of the sheet material which is to be reproduced. It is thus not necessary to scan the full length of the drum where the sheet material is of a relatively shorter length which makes for more rapid operation of the apparatus.

Figure 7:
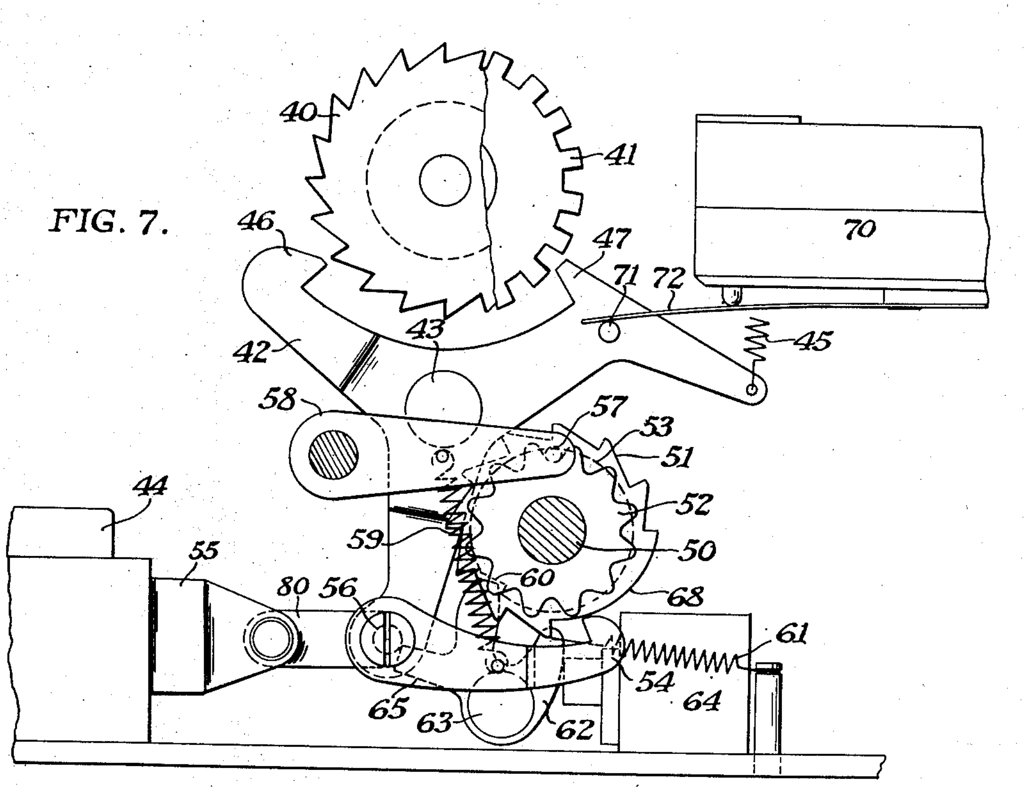
Fig. 7 is an elevational view of the device shown in Fig. 6.

By means of the selector mechanism 13, which will now be described, the operator may preset the apparatus to make some predetermined number of copies after which the scanning will automatically terminate. The selector mechanism comprises the shaft 50 upon which are non-rotatably mounted a ratchet 51, a starwheel 52 and a cam 53. The ratchet 51 is adapted to be engaged by a pawl 54 which is secured at one end through a connecting link 80 to the plunger 55 of the solenoid 44. As illustrated in Figs. 3 and 7, the lever 42 and pawl 54 are pivotally secured by the pin 56 to the end of the link 80 so that movement of the plunger will simultaneously actuate the lever and the pawl. Thus, upon the scanning head completing a scanning operation and contacting the control element 48, the solenoid is energized to retract the plunger and the connecting link which rocks the lever 42 whereby pawl 46 engages ratchet 40 to reverse the rotation of screw 22 and pawl 54 functions to rotate 51 through a fixed angle. Upon the scanning head returning to its initial position, contact is made with control element 49 and the solenoid is deenergized. Coil spring 45 causes the lever to pivot in an opposite direction to disengage pawl 46 from ratchet 40 and engage the notched disc 41, whereupon the scanning head begins another scanning operation. As the lever is thus pivoted, the solenoid plunger is withdrawn from the solenoid coil by this same spring action and pawl 54 slides over the ratchet without rotating the same. It is thus apparent that the number of times the sheet is scanned may be determined by the angle through which the ratchet 51 is rotated. The function of the starwheel 52 and detent 57 is to secure the shaft 50 against rotation when the pawl 54 slides over the ratchet and yet permit the pawl to rotate the ratchet when the solenoid is energized. To maintain the detent in continuous contact with the starwheel and at the same time keep the pawl 54 in constant engagement with the ratchet, the pawl 54 and detent-mounting arm 58 are connected by a tension spring 59.

Figure 5:
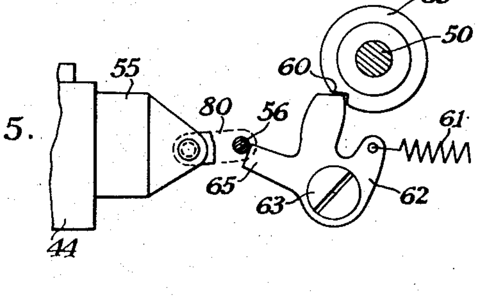
Fig. 5 is similar to Fig. 4 and illustrates the manner in which this element functions.

The cam 53 on shaft 50 is designed to discontinue the scanning operation after the desired number of scannings has been completed. The cam, provided with the notch 60, cooperates with the cam follower 62 which is maintained in continuous engagement therewith by the tension spring 61. Since the cam is fixed to the shaft 50 it will be rotated through the same angle through which the ratchet 51 is rotated by the associated pawl at the completion of each scanning operation. The cam is so oriented upon the shaft that, upon the completion of the last scanning, the rotation of the shaft by the pawl and ratchet mounted thereon will bring the notch 60 to a position in which the cam follower 62 is received in the notch, as illustrated in Fig. 5. The rotation of the cam follower about the pin 63, as it engages the cam notch, produces two results, one of which is the closing of the switch 64, seen in Fig. 7, which energizes a solenoid which in turn disengages the clutch 18 whereby the scanning drum will no longer be driven by the drive means. This solenoid and its connection to the clutch have not been illustrated since the details thereof constitute no part of the present invention and their incorporation in the described apparatus would be well within the province of the skilled worker in the art. The second result of the rotation of the cam follower occurs after the scanning head has returned to its initial position and the solenoid 44 has been deenergized. The spring 45, which would ordinarily pivot the lever 42 so that the notched disc 41 would be engaged by the tooth 47, is restrained from doing so by reason of the blocking of the withdrawal of the plunger by the cam follower. This is clearly seen in Fig. 5 where a projection 65 on the cam follower 62 has been rotated to a position where it physically blocks the withdrawal of the plunger by contact with the pin 56 on the end of the link 80 which is connected to the solenoid plunger. The lever 42 is thus held in a neutral position as seen in Fig. 7 and, since neither the ratchet 40 nor the notched disc 41 is restrained against rotation, the drive means will no longer rotate screw 22 and the scanning head will stop at its initial position. Fig. 4 illustrates the manner in which the projection 65 on the cam follower is inoperative to block the withdrawal of the solenoid plunger while the cam follower remains out of engagement with the notch 60 in cam 53.

Since the total angle through which the shaft 50 and the ratchet mounted thereon may be rotated before the cam notch 60 is engaged by the cam follower determines the number of scannings of the sheet which will occur before the scanning operation is automatically stopped, a presetting of the orientation of this shaft by the operator before the first scanning is begun may be made to automatically determine how many times the sheet to be copied will be scanned without further intervention by the operator, after which the drum will automatically cease to rotate and the scanning head will come to a halt at its initial position. For this purpose a suitably calibrated dial 67 is mounted on the shaft 50, the fingers thereon indicating the number of scannings, and, therefore, copies, which the apparatus will make before the scanning head comes to a halt.

On occasion it will be desirable to have the machine repeat indefinitely to produce an indefinite number of copies. To this end the ratchet 51, instead of having a completely toothed peripheral edge, has a smooth toothless section 68 in the otherwise regularly toothed edge. When the shaft 50 is so oriented by the operator that the smooth toothless section of the ratchet lies adjacent to the engaging pawl 54, it will be evident that the actuation of the pawl by the energizing of the solenoid 44 will produce no corresponding rotation of the ratchet 51 since the pawl fails to engage any ratchet tooth. Neither the shaft 50 nor the cam 53 fixed thereon will thus be rotated and the cam will remain ineffective to stop the continued operation of the scanning head with the result that the scanning of the sheet will be repeated indefinitely.

Figure 6:
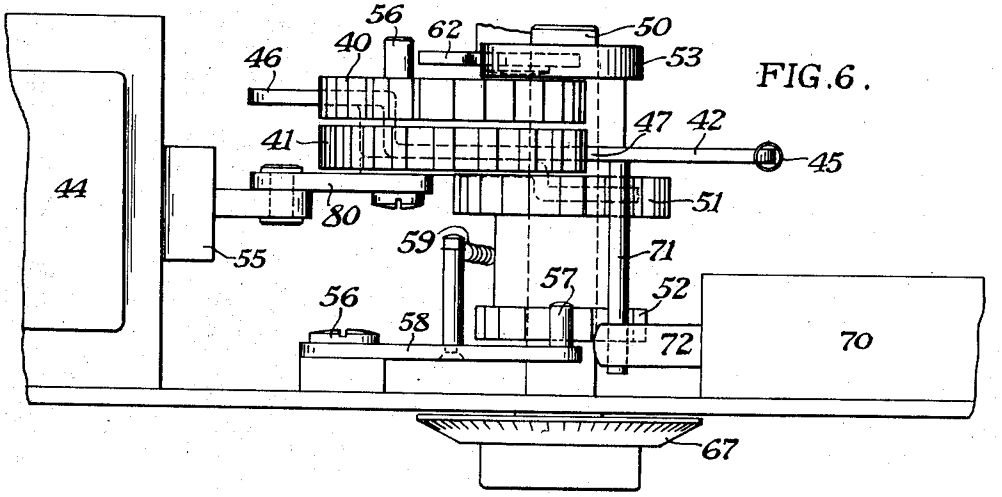
Fig. 6 is an enlarged plan view of the selector mechanism and certain details of the reversing mechanism which cooperate therewith.

The recorder unit 14 may be of conventional design and will produce a single copy with each scanning of the original sheet in response to signals generated by the photoelectric cell, these signals being suitably amplified by the amplifier unit 69. Preferably, such a recorder will comprise means for feeding paper from a continuous roll, the paper drive being synchronized with the rotation of screw 22 and the recorder scanner will be synchronized with the rotation of the drum 10. The recorder scanner unit may comprise the conventional drum with a raised helical rib thereon and a magnetically-actuated printing bar, in which case synchronization with the sheet scanning apparatus described in this specification may be had by interconnecting this drum having the helical rib with the drum 10. However, since the specific recording means forms no part of the present invention, further description and illustration is omitted. Since during the return of the scanning head 11 to its initial position no recording is to be effected, it is preferable to interrupt the reception of signals from the photoelectric cell 26 by the amplifier and/or recorder which can readily be accomplished by the opening of a switch in the circuit. Such a switch 70 is seen in Figs. 6 and 7, the closing of which is produced only when the projection 71 on the lever 42 forces the resilient element 72 upward, as viewed in Fig. 7, when the tooth 47 engages the notched disc 41. For any other position of lever 42 the switch 70 remains open and no recording is effected at the recorder.

From the foregoing description, it will be apparent that I have provided means for obtaining all the objects and advantages of this invention.

What I claim and desire to secure by Letters Patent of the United States is:

1. In a facsimile apparatus for selectively making a predetermined or an indefinite number of copies, a scanning drum and a scanning head, means including a rotatable screw adapted to drive the scanning head in a path parallel to the axis of rotation of the drum, drive means including a reversing mechanism for alternately rotating the screw clockwise and counterclockwise, means including a solenoid for actuating the reversing mechanism, the scanning head being adapted to automatically alternately energize and deenergize said solenoid upon its reaching certain predetermined limits in its travel upon said screw, a selector mechanism for automatically determining the number of times the sheet to be copied will be scanned, said selector mechanism including a rotatable shaft which may be preset by rotating it through an angle whose value is determined by the number of copies to be produced, a ratchet on said shaft, a pawl cooperating with said ratchet and adapted to rotate the ratchet through fixed angle through the operation of said solenoid at the completion of a scanning of said sheet, a cam on said shaft, a cam follower cooperating with said cam and adapted to disconnect said drive means from said rotatable screw after the shaft has been rotated, by the operation of said pawl, through a total angle corresponding to the number of copies to be produced, and means for rendering the selector mechanism inoperative whereby the scanning of said sheet will repeat indefinitely.

2. In a facsimile apparatus for selectively making a predetermined or an indefinite number of copies, a rotatable drum for mounting the sheet to be copied, a scanning head, means for driving the scanning head along a linear path parallel to the axis of the drum, a mechanism for reversing the direction of travel of said scanning head, means including a solenoid for actuating said reversing mechanism, control elements adapted to be engaged by the scanning head at each end of its path of travel for controlling the operation of said solenoid, the distance between said elements being adjustable to determine the length of sheet material to be scanned on the drum, a selector mechanism for automatically determining the number of times the sheet to be copied will be scanned, said selector mechanism including a rotatable shaft which may be preset by rotating it through an angle whose value is determined by the number of copies to be produced, a ratchet on said shaft, a pawl cooperating with said ratchet and adapted to rotate the ratchet through a fixed angle through the operation of said solenoid at the completion of a scanning of said sheet, a cam on said shaft, a cam follower cooperating with said cam and adapted to disconnect said drive means from the scanning head after the shaft has been rotated, by the operation of said pawl, through a total angle corresponding to the number of copies to be produced, and means for rendering the selector mechanism inoperative whereby the scanning of said sheet will repeat indefinitely.

3. In a facsimile apparatus for selectively making a predetermined or an indefinite number of copies, a rotatable drum for mounting the sheet to be copied, a scanning head, means for driving the scanning head along a linear path parallel to the axis of the drum, a mechanism for reversing the direction of travel of said scanning head, a selector mechanism for automatically determining the number of times the sheet to be copied will be scanned, said selector mechanism including a rotatable shaft which may be preset by rotating it through an angle whose value is determined by the number of copies to be produced, a ratchet on said shaft, a pawl cooperating with said ratchet and adapted to rotate the ratchet through a fixed angle through the operation of said reversing mechanism after the completion of a scanning of said sheet, a cam on said shaft, a cam follower cooperating with said cam and adapted to cause said reversing mechanism to become inoperative and the motion of said scanning head to be arrested after the shaft has been rotated, by the operation of said pawl, through a total angle corresponding to the number of copies to be produced, and means for rendering the selector mechanism inoperative whereby the scanning of said sheet will repeat indefinitely.

4. In a facsimile apparatus for selectively making a predetermined or an indefinite number of copies, a rotatable drum for mounting the sheet to be copied, a scanning head, means for driving the scanning head along a linear path parallel to the axis of the drum, a mechanism for reversing the direction of travel of said scanning head, a selector mechanism for automatically determining the number of times the sheet to be copied will be scanned, said selector mechanism including a rotatable shaft which may be preset by rotating it through an angle whose value is determined by the number of copies to be produced, a ratchet fixed on said shaft, the peripheral edge thereof having a smooth toothless section in the otherwise regularly toothed edge, a pawl cooperating with the toothed edge of said ratchet and adapted to rotate the ratchet through a fixed angle through the operation of said reversing mechanism after the completion of a scanning of said sheet, a cam fixed on said shaft, and a cam follower cooperating with said cam and adapted to cause said reversing mechanism to become inoperative and the motion of said scanning head to be arrested after the shaft has been rotated, by the operation of said pawl, through a total angle corresponding to the number of copies to be produced, said smooth section of the ratchet when properly oriented with respect to the pawl by presetting being adapted to render the pawl ineffective to rotate the ratchet at the completion of the scanning of said sheet whereby the scanning of the sheet is caused to repeat indefinitely.

5. In a facsimile apparatus for selectively making a predetermined or an indefinite number of copies, a rotatable drum for mounting the sheet to be copied, a scanning head, means for driving the scanning head along a linear path parallel to the axis of the drum, a mechanism for reversing the direction of travel of said scanning head, a selector mechanism for automatically determining the number of times the sheet to be copied will be scanned, said selector mechanism including a rotatable shaft which may be preset by rotating it through an angle whose value is determined by the number of copies to be produced, a ratchet on said shaft, a pawl cooperating with said ratchet and adapted to rotate the ratchet through a fixed angle through the operation of said reversing mechanism after the completion of a scanning of said sheet, a cam on said shaft, a cam follower cooperating with said cam and adapted to cause said reversing mechanism to become inoperative and the motion of said scanning head to be arrested after the shaft has been rotated, by the operation of said pawl, through a total angle corresponding to the number of copies to be produced, and means for causing the cam and follower mechanism to become ineffective to arrest the repetition of the scanning of said sheet whereby this scanning will repeat indefinitely.

6. In a facsimile apparatus for selectively making a predetermined number of copies, a rotatable drum for mounting the sheet to be copied, a scanning head, a rotatable screw threaded into the scanning head and adapted to drive the head by rotation of said screw, drive means including a reversing mechanism for alternately rotating the screw clockwise and counterclockwise, means including a solenoid for actuating the reversing mechanism, control elements adapted to be engaged by the scanning head at each end of its path of travel for controlling the operation of said solenoid, the distance between said elements being adjustable to determine the length of sheet material to be scanned on the drum, a selector mechanism for automatically determining the number of times the sheet to be copied will be scanned, said selector mechanism including a rotatable shaft which may be preset by rotating it through an angle whose value is determined by the number of copies to be produced, a ratchet fixed on said shaft, a pawl cooperating with said ratchet and adapted to rotate the ratchet through a fixed angle through the operation of said solenoid at the completion of a scanning of said sheet, and means for automatically rendering the drive means ineffective to drive said rotatable screw after said shaft has been rotated, by the operation of said pawl, through a total angle corresponding to the number of copies to be produced.

7. In a facsimile apparatus for selectively making a predetermined or an indefinite number of copies, a rotatable drum for mounting the sheet to be copied, a scanning head, a rotatable screw threaded into the scanning head and adapted to drive the head by rotation of said screw, drive means including a reversing mechanism for alternately rotating the screw clockwise and counterclockwise, means including a solenoid for actuating the reversing mechanism, control elements adapted to be engaged by the scanning head at each end of its path of travel for controlling the operation of said solenoid, the distance between said elements being adjustable to determine the length of sheet material to be scanned on the drum, a selector mechanism for automatically determining the number of times the sheet to be copied will be scanned, said selector mechanism including a rotatable shaft which may be preset by rotating it through an angle whose value is determined by the number of copies to be produced, a ratchet fixed on said shaft, the peripheral edge thereof having a smooth toothless section in the otherwise regularly toothed edge, a pawl cooperating with the toothed edge of said ratchet and adapted to rotate the ratchet through a fixed angle through the operation of said solenoid at the completion of a scanning of said sheet, and means on said shaft adapted to cause said reversing mechanism to become inoperative and the motion of said scanning head to be arrested after the shaft has been rotated, by the operation of said pawl, through a total angle corresponding to the number of copies to be produced, said smooth section of the ratchet when properly oriented with respect to the pawl by presetting being adapted to render the pawl ineffective to rotate the ratchet at the completion of the scanning of said sheet whereby the scanning of the sheet is caused to repeat indefinitely.

8. In a facsimile apparatus, means for mounting and moving the sheet to be copied, a scanning head adapted to travel in a path transverse of the direction of movement of said sheet, means for driving the scanning head, a mechanism for reversing the direction of travel of said scanning head, said reversing mechanism comprising a planetary transmission having three concentrically mounted sun gears, one of which is fixed to the drive means, an element adapted to be rotated about the axis of said sun gears and carrying a stud, the axis of which is parallel to and spaced from the axis of said sun gears, a series of three planet gears attached to each other and mounted upon said stud for rotation about the axis thereof, each planet gear being in mesh with a different sun gear, and means for locking one or the other of the two sun gears not fixed to the drive means whereby rotation of said element carrying the stud will impart a clockwise and a counterclockwise rotation to the sun gear fixed to the drive means depending upon which of the two sun gears is locked and as a result of the relative number of teeth on said latter gears and on the planet gears in mesh therewith, a solenoid adapted to actuate the locking means, and control elements adapted to be engaged by the scanning head at each end of its path of travel for controlling operation of said solenoid.

9. An apparatus according to claim 8 including further a selector mechanism for automatically determining the number of times the sheet to be copied will be scanned, said selector mechanism including a rotatable shaft which may be preset by rotating it through an angle whose value is determined by the number of copies to be produced, a ratchet fixed on said shaft, a pawl cooperating with said ratchet and adapted to rotate the ratchet through a fixed angle through the operation of said solenoid at the completion of a scanning of said sheet, and means for automatically rendering said locking means inoperative to lock either of said sun gears adapted to be locked thereby after said selector mechanism shaft has been rotated, by the operation of said pawl, through a total angle corresponding to the number of copies to be produced whereby said drive means will no longer operate to drive said scanning head.

10. An apparatus according to claim 8 including further a selector mechanism for automatically determining the number of times the sheet to be copied will be scanned, said selector mechanism including a rotatable shaft which may be preset by rotating it through an angle whose value is determined by the number of copies to be produced, a ratchet fixed on said shaft, the peripheral edge thereof having a smooth toothless section in the otherwise regularly toothed edge, a pawl cooperating with the toothed edge of said ratchet and adapted to rotate the ratchet through a fixed angle through the operation of said solenoid at the completion of a scanning of said sheet, and means for automatically causing said locking means to become in operative to lock either of said sun gears adapted to be locked thereby after said selector mechanism shaft has been rotated, by the operation of said pawl, through a total angle corresponding to the number of copies to be produced whereby said drive means will no longer operate to drive said scanning head, said smooth section of the ratchet when properly oriented with respect to the pawl by presetting being adapted to render the pawl ineffective to rotate the ratchet at the completion of the scanning of said sheet whereby the scanning of the sheet is caused to repeat indefinitely.

11. In a facsimile scanning apparatus having a mechanism for automatically reversing the direction of movement of the scanning head, a selector mechanism for automatically determining the number of times a sheet to be copied will be scanned, said selector mechanism including a rotatable shaft which may be preset by rotating it through an angle whose value is determined by the number of copies to be produced, a ratchet fixed on said shaft, the peripheral edge thereof having a smooth toothless section in the otherwise regularly toothed edge, a pawl cooperating with the toothed edge of said ratchet and adapted to rotate the ratchet through a fixed angle through the operation of the reversing mechanism at the completion of a scanning of the sheet, and means connected to said shaft for causing the reversing mechanism to become inoperative after the shaft has been rotated, by the operation of said pawl, through a total angle corresponding to the number of copies to be produced, said smooth section of the ratchet when properly oriented with respect to the pawl by presetting being adapted to render the pawl ineffective to rotate the ratchet at the completion of the scanning of said sheet whereby the scanning of the sheet is caused to repeat indefinitely.

12. In a facsimile scanning apparatus having a mechanism for automatically reversing the direction of movement of the scanning head, a selector mechanism for automatically determining the number of times a sheet to be copied will be scanned, said selector mechanism including a rotatable shaft which may be preset by rotating it through an angle whose value is determined by the number of copies to be produced, a ratchet fixed on said shaft, a pawl cooperating with said ratchet and adapted to rotate the ratchet through a fixed angle through the operation of the reversing mechanism at the completion of a scanning of the sheet, a cam on said shaft adapted to cause the reversing mechanism to become inoperative after the shaft has been rotated, by the operation of said pawl, through a total angle corresponding to the number of copies to be produced, and manually-operable means for rendering inoperative the rotation of said ratchet by the pawl by the operation of the reversing mechanism at the completion of the scanning of said sheet whereby the scanning of the sheet is caused to repeat indefinitely.

13. In a facsimile apparatus for selectively making a predetermined or an indefinite number of copies, a rotatable drum for mounting the sheet to be copied, a scanning head adapted to travel along a linear path parallel to the axis of the drum, means for driving the scanning head including a reversing mechanism, means including a solenoid for actuating the reversing mechanism, the scanning head being adapted to automatically energize and deenergize said solenoid upon its reaching certain predetermined limits in its path of travel, a selector mechanism for automatically determining the number of times the sheet to be copied will be scanned, said selector mechanism including a rotatable shaft which may be preset by rotating it through an angle whose value is determined by the number of copies to be produced, a ratchet fixed on said shaft, a pawl cooperating with said ratchet and adapted to rotate the ratchet through a fixed angle through the operation of said solenoid at the completion of a scanning of said sheet, means on said shaft adapted to disconnect said drive means from said scanning head after the shaft has been rotated, by the operation of said pawl, through a total angle corresponding to the number of copies to be produced, and means for rendering the selector mechanism inoperative whereby the scanning of said sheet will repeat indefinitely.

14. In a facsimile apparatus for selectively making a predetermined or an indefinite number of copies, a rotatable drum for mounting the sheet to be copied, a scanning head adapted to travel along a linear path parallel to the axis of the drum, means for driving the scanning head including a reversing mechanism, means including a solenoid for actuating the reversing mechanism, the scanning head being adapted to automatically energize and deenergize said solenoid upon its reaching certain limits in its path of travel, a selector mechanism for automatically determining the number of times the sheet to be copied will be scanned, said selector mechanism including a rotatable shaft which may be preset by rotating it through an angle whose value is determined by the number of copies to be produced, a ratchet fixed on said shaft, the peripheral edge thereof having a smooth toothless section in the otherwise regularly toothed edge, a pawl cooperating with the toothed edge of said ratchet and adapted to rotate the ratchet through a fixed angle through the operation of said solenoid at the completion of a scanning of said sheet, and means on said shaft adapted to disconnect said drive means from said scanning head after the shaft has been rotated, by the operation of said pawl, through a total angle corresponding to the number of copies to be produced, said smooth section of the ratchet when properly oriented with respect to the pawl by presetting being adapted to render the pawl ineffective to rotate the ratchet at the completion of the scanning of said sheet whereby the scanning of the sheet is caused to repeat indefinitely.

15. In a facsimile apparatus for selectively making a predetermined or an indefinite number of copies, a rotatable drum for mounting the sheet to be copied, a scanning head adapted to travel along a linear path parallel to the axis of the drum, means for driving the scanning head including a reversing mechanism, means including a solenoid for actuating the reversing mechanism, control elements adapted to be engaged by the scanning head at each end of its path of travel for controlling the operation of said solenoid, the distance between said elements being adjustable to determine the length of sheet material to be scanned by the head, a selector mechanism for automatically determining the number of times the sheet to be copied will be scanned, said selector mechanism including a rotatable shaft which may be preset by rotating it through an angle whose value is determined by the number of copies to be produced, a ratchet fixed on said shaft, the peripheral edge thereof having a smooth toothless section in the otherwise regularly toothed edge, a pawl cooperating with the toothed edge of said ratchet and adapted to rotate the ratchet through a fixed angle through the operation of said solenoid at the completion of a scanning of said sheet, a cam fixed on said shaft, and a cam follower cooperating with said cam and adapted to disconnect said drive means from said scanning head after the shaft has been rotated, by the operation of said pawl, through a total angle corresponding to the number of copies to be produced, said smooth section of the ratchet when properly oriented with respect to the pawl by presetting being adapted to render the pawl ineffective to rotate the ratchet at the completion of the scanning of said sheet whereby the scanning of the sheet is caused to repeat indefinitely.

CLAYTON E. HUNT, Jr.

References Cited in the file of this patent

UNITED STATES PATENTS

| Number | Name | Date |
|---|---|---|
| 1,918,124 | Nicolson | July 11, 1933 |
| 2,354,571 | Blain | July 25, 1944 |
| 2,402,438 | Ochsner | June 18, 1946 |
| 2,587,145 | Grib | Feb. 26, 1952 |